(12) United States Patent
Curto (10) Patent No.: US 8,905,477 B2
(45) Date of Patent: Dec. 9, 2014

(54) INFLATABLE CHILD SEAT (71) Applicant: Andrew E. Curto, Northport, NY (US)

(72) Inventor: Andrew E. Curto, Northport, NY (US)

(*) Notice: Subject to any disclaimer, the term of this patent is extended or adjusted under 35 U.S.C. 154(b) by 0 days.

(21) Appl. No.: 14/019,679

(22) Filed: Sep. 6, 2013

(65) Prior Publication Data
US 2014/0001796 A1 Jan. 2, 2014

Related U.S. Application Data (63) Continuation of application No. 13/247,666, filed on Sep. 28, 2011, now Pat. No. 8,528,983.

(51) Int. Cl.
| | |
|---|---|
| B60N 2/26 | (2006.01) |
| A47D 1/10 | (2006.01) |
| A47B 83/02 | (2006.01) |
| B60N 3/10 | (2006.01) |
| B60N 2/28 | (2006.01) |
| B60R 7/04 | (2006.01) |
| A47C 4/54 | (2006.01) |
| A47D 15/00 | (2006.01) |
| A47C 4/52 | (2006.01) |
| B60N 3/00 | (2006.01) |
| A47D 1/00 | (2006.01) |
| B60N 2/44 | (2006.01) |
| B64D 11/06 | (2006.01) |

(52) U.S. Cl.
CPC ...... *B60N 2/2806* (2013.01); *B64D 2011/0624* (2013.01); *B60N 3/101* (2013.01); *A47D 1/103* (2013.01); *B60R 7/043* (2013.01); *A47C 4/54* (2013.01); *B60N 2/2884* (2013.01); *A47D 15/006* (2013.01); *A47C 4/52* (2013.01); *B60N 2/2845* (2013.01); *B60N 2/2803* (2013.01); *B60N 3/002* (2013.01); *B60N 2/2812* (2013.01); *A47D 1/00* (2013.01); *B60N 2002/2896* (2013.01); *B60N 2/4415* (2013.01); *Y10S 297/03* (2013.01)
USPC ........ 297/250.1; 297/148; 297/153; 297/253; 297/255; 297/256; 297/256.16; 297/452.41; 297/DIG. 3

(58) Field of Classification Search
USPC ....... 297/250.1–256.17, 452.41, DIG. 3, 148, 297/153
See application file for complete search history.

(56) References Cited

U.S. PATENT DOCUMENTS

| | | | |
|---|---|---|---|
| D278,004 S | 3/1985 | Sigona | |
| 4,711,490 A * | 12/1987 | Brand | ........................ 297/250.1 |

(Continued)

*Primary Examiner* — Rodney B White
(74) *Attorney, Agent, or Firm* — Leo G. Lenna; Sorell, Lenna & Schmidt LLP (57) ABSTRACT

An inflatable child seat for use in an airplane having a base panel having at least one inflatable air chamber is provided. The inflatable child seat also includes two side panels, each of which have at least one inflatable air chamber. Both side panels are connected to the base panel. A back panel is further provided, having at least one inflatable air chamber, and is connected to the two side panels and the base panel. The back panel is disposed at an angle relative to the base panel. The inflatable child seat also has a belt configured to restrain a child in the seat. The inflatable child seat additionally has a cavity disposed in the back panel and is configured for receiving a seat belt from an airplane or car seat for securing the child seat to the airplane or car seat. The inflatable child seat is provided with at least one port that is in communication with one or more of the air chambers and serves as the means for inflating and deflating these chambers.

19 Claims, 3 Drawing Sheets

(56) References Cited

U.S. PATENT DOCUMENTS

| | | |
|---|---|---|
| 4,768,830 A | 9/1988 | Musselwhite |
| 5,005,902 A | 4/1991 | Farnworth et al. |
| 5,292,175 A | 3/1994 | Artz |
| 5,292,176 A | 3/1994 | Artz |
| 5,335,968 A | 8/1994 | Sheridan et al. |
| 5,468,047 A * | 11/1995 | Goor et al. ................ 297/250.1 |
| 5,516,188 A | 5/1996 | Bruhnke et al. |
| D399,350 S | 10/1998 | Hudson et al. |
| 5,868,463 A | 2/1999 | MacKenzie et al. |
| 5,879,053 A | 3/1999 | Lux et al. |
| 5,896,598 A | 4/1999 | Jeans |
| D429,106 S | 8/2000 | Bortolotto et al. |
| 6,135,551 A | 10/2000 | Linder |
| 6,224,444 B1 | 5/2001 | Klimenko |
| 6,386,632 B1 * | 5/2002 | Goor et al. ........... 297/256.16 X |
| 6,390,559 B1 | 5/2002 | Schnitzhofer |
| 6,601,916 B1 * | 8/2003 | Kamiki ...................... 297/250.1 |
| 6,685,266 B2 * | 2/2004 | James et al. ............... 297/250.1 |
| 6,715,164 B2 | 4/2004 | Steadman et al. |
| 6,886,202 B2 | 5/2005 | Frechette |
| 7,367,599 B2 | 5/2008 | Thomson |
| 2010/0276972 A1 * | 11/2010 | Dickinson et al. ..... 297/250.1 X |

* cited by examiner

INFLATABLE CHILD SEAT

This application is a continuation of U.S. patent application Ser. No. 13/247,666, which issued as U.S. Pat. No. 8,528,983 and is herein incorporated by reference in its entirety.

FIELD OF THE INVENTION

The present invention relates generally to an airplane seat for children, specifically one that is inflatable and collapsible.

BACKGROUND OF THE INVENTION

Child car seats are well known in the art and are designed to secure a child in the seat of a moving vehicle. Restraining seats for infants are often designed for both rear- and forward-facing positioning, depending on the size and age of the child. Recent evidence suggests that the longer an infant is able to be positioned in a rear-facing seat, the more likely that infant will be sufficiently protected in a crash than in a forward-facing seat.

Conventional child car seats are composed of polypropylene plastic to provide structural support and padding or other cushioned materials to provide a comfortable seat for a child. Conventional child car seats can be used to transport a child in an airplane seat, but there are several drawbacks to this approach.

Conventional child car seats are sometimes approved for use on airplanes, but are unwieldy and difficult to carry when not in use. This is especially true when a conventional child seat is used by parents or guardians in airplane travel. Another problem is that conventional child car seats are difficult to store when not in use, especially where space is limited in a home or in a hotel if parents or guardians of a child are traveling.

Some products are available that purport to enable a more portable child seat for use in an airplane. Such products often consist primarily of reducing the size slightly of a conventional car seat and may have a handle and wheels for rolling the child seat. These so-called portable child seats still remain bulky and are difficult to store and carry when not in use.

Another problem facing parents and guardians in traveling with small children is that conventional child car seats and travel seats are incapable of providing sufficient distractions to a child during a long flight. For travelers with children, keeping them quiet throughout a flight is often an insurmountable task. What is needed is a compact, secure travel seat that can enable a parent or guardian to placate an otherwise fussy infant or child.

SUMMARY OF THE INVENTION

It is an object of this invention to provide a secure child seat that is inflatable and deflatable and collapsible when not in use.

What is needed is a structurally sound, portable child seat that can be used on a plane that is easy to store when not in use and is configured so as to allow parents to easily supervise a child in flight. This disclosure provides improvements over the prior art.

Accordingly, it is an object of the invention to provide a lightweight, protective seat for a child for use in traveling on an airplane.

Another object is to provide an inflatable child airplane seat that is easily stored and carried when not in use.

A further object is to provide a travel seat for a child that enables parents and guardians to easily supervise a child in flight.

A still further purpose of the invention is to provide distractions to a child in a travel seat, and to keep the child comfortable and quiet during long flights.

According to the present invention, there is provided an inflatable child seat for use in an airplane. The inflatable child seat comprises a base panel, a back panel, at least one belt configured for securing a child in the inflatable seat, a cavity configured for receiving a seat belt configured for securing the inflatable seat to an airplane or car seat, and at least one port in communication with at least one of the air chambers of the inflatable seat. In the alternate, the inflatable material used can have enough rigidity when inflated to support the inflated seat and no additional rigid element is needed.

The base panel contains one or more inflatable air chambers that are separately inflatable and deflatable, or comprise a contiguous unit. The base panel can be constructed of any material that is sufficiently resilient and elastic capable of repeated inflation and deflation, such as PVC, rubbers, plastic, or other materials that can be optionally reinforced with a backing material like nylon for greater strength. The base can be totally inflatable or can further contain a rigid element disposed at the bottom of the base to provide structural support and serve as a framework for a traveling case to contain the deflated child seat for portability. This rigid element can be constructed using conventional plastics or other such materials.

The base can also have attachments for securing a restraining device to the seat for use in securing the child within the inflatable seat. The base may also have attachments for securing the inflatable seat to a vehicle using a latch lower anchor situated on the seat to which the inflatable seat is to be attached.

There are two side panels, each attached to the base. Each of the side panels contains one or more air chambers that are separately inflatable, or can comprise a contiguous unit. The side panels can be constructed of a similar material as that of the base, namely any resilient material capable of repeated inflation and deflation. Examples of these materials are PVC, rubber or other plastic materials that may optionally contain a reinforcing material such as nylon for added resiliency. The side panels can comprise additional structures such as one or more pockets on each of the sidewalls. These pockets can be composed of similar materials as the sidewalls, can be stretchable fabric, or other fabrics suitable for attachment to the sidewalls. These pockets can be used for storage of suitably sized materials for use in distracting or entertaining a child using the inflatable seat. The sidewalls also contain structures suitable for attaching a tray between the two sidewalls. The tray can comprise a rigid material composed of plastic or other such material. The tray is disposed between the two sidewalls and can be used for placement of food, drink, or other items needed in caring for or entertaining a child on a long flight. The tray can further contain one or more holes through its structure, suitable for placement of cups, bowls, or other such materials. The sidewalls are configured to receive the tray, and can attach to the tray through any conventional structures. Examples of these attachment structures are metal snaps disposed on the sidewall and corresponding structures on the tray, plastic tabs and holes for snap-placement of the tray on the sidewalls, or a securing strap from the tray to the sidewalls. The securing strap can be constructed of hook and loop fabric, or fabric using a plastic latching or belting device.

There is also a back panel that also contains one or more air chambers that can be separately inflatable or comprise one contiguous unit. The back panel is comprised of identical material to that of the base panel and side walls. The back panel can also comprise a rigid structure element, disposed at the bottom portion of the back panel for providing structural support and for use as a framework for a traveling case for holding the deflated and collapsed inflatable seat when not in use. This rigid element is composed of identical materials to the rigid element of the base; namely conventional plastics or other such suitable materials. The back panel is attached to each of the sidewalls and to the base. The back panel is also disposed at an angle relative to that of the base, from about 5° to about 80°, preferably from about 15° to about 45°. The back panel further comprises a belt for securing the child seated therein. This belt can be made from any material suitable for securing a child, such as fabric or similar material that the back panel is constructed of. The belt for securing the child can comprise a 5-point harness belt that attaches to a buckle located on the base panel.

The back panel can also have distracting implements for entertaining a child using the inflatable seat. A mobile can be attached to the top of the back panel to allow a child seated in the inflatable seat to look up at it. One or more speakers can be disposed in the back panel. These one or more speakers are connected to an audio jack that is suitable for attachment to a portable music device, a cell phone, or to an airplane audio jack for music or other sounds useful in entertaining and distracting a child in flight. A covering hood can also be attached to the back panel, for shielding a child's eyes from bright lights to enable the child to sleep if needed. The hood can be composed of any material such as fabrics or be of the same inflatable material as the back panel. The hood is capable of being folded up and retracted or separately deflated when not in use.

To enable additional portability of the inflatable seat when in use, a rigid handle can be connected to the back panel by pivot points. The handle is rotable about the axis of the back panel and locks into position either in predetermined positions or can be equipped with a locking system that locks the handle into any position about a swivel point. The handle and pivot points can be comprised of plastics capable of supporting the weight of the inflatable seat then being used by a parent or guardian to carry the inflatable seat.

A cavity is disposed within the back panel. The cavity is capable of receiving a seat belt from the car or airplane seat that secures it. The cavity extends between the width of the inflatable seat in order to secure the car or airplane seat belt. The cavity can be a hole in which to pass the belt through or contain additional structural support to secure the car or airplane seat to the inflatable car seat. The cavity can be composed of a rigid material such as plastic for securing the inflatable car seat to the car or airplane seat.

The inflatable seat also comprises at least one port connected with at least one of the air chambers of the inflatable car seat for inflating or deflating the inflatable car seat. The port can comprise an inflation valve, which allows a user to inflate or deflate the inflatable car seat by mouth or using a hand or electric pump. The port can also comprise an electric device capable of inflating and deflating the entire inflatable seat with the press of a button or flipping a switch. It is understood that if there is a single port disposed on the inflatable seat, then all air chambers that comprise the inflatable seat will be connected for contiguous inflation or deflation. In the case where there are separately inflatable and deflatable air chambers, each shall have a corresponding port.

In one particular embodiment in accordance with the principles of the present disclosure, an inflatable child seat for use in an airplane is provided. The inflatable child seat includes a base panel having at least one inflatable air chamber. The inflatable child seat also includes two side panels, each of which have at least one inflatable air chamber. Both side panels are connected to the base panel. A back panel is further provided, having at least one inflatable air chamber, and is connected to the two side panels and the base panel. The back panel is disposed at an angle relative to the base panel from about 5° to about 80°. The inflatable child seat also has a belt configured to restrain a child in the seat. The inflatable child seat additionally has a cavity disposed in the back panel, and is configured for receiving a seat belt from an airplane or car seat for securing the child seat to the airplane or car seat. The inflatable child seat is provided with at least one port that is in communication with one or more of the air chambers, and serves as the means for inflating and deflating these chambers.

In another embodiment in accordance with the principles of the present disclosure, an inflatable child seat for use in an airplane is provided. The inflatable child seat includes a base panel having at least one inflatable air chamber. The inflatable child seat also includes two side panels, each of which have at least one inflatable air chamber. Both side panels are connected to the base panel. A back panel is further provided, having at least one inflatable air chamber, and is connected to the two side panels and the base panel. The back panel is disposed at an angle relative to the base panel from about 5° to about 80°. The inflatable child seat also has a belt configured to restrain a child in the seat. The belt comprises a harness and is attached to both the back and base panels for securing the child in the inflatable seat. The inflatable child seat additionally has a cavity disposed in the back panel, and is configured for receiving a seat belt from an airplane or car seat for securing the child seat to the airplane or car seat. The inflatable child seat is provided with at least one port that is in communication with one or more of the air chambers, and serves as the means for inflating and deflating these chambers. The inflatable seat comprises a contiguous air chamber wherein the air chambers of the base, back, and sidewalls are all interconnected for simultaneous inflation and deflation of the entire inflatable seat.

In a further embodiment in accordance with the principles of the present disclosure, an inflatable child seat for use in an airplane is provided. The inflatable child seat includes a base panel having at least one inflatable air chamber. The inflatable child seat also includes two side panels, each of which have at least one inflatable air chamber. Both side panels are connected to the base panel. A back panel is further provided, having at least one inflatable air chamber, and is connected to the two side panels and the base panel. The back panel is disposed at an angle relative to the base panel from about 5° to about 80°. The inflatable child seat also has a belt configured to restrain a child in the seat. The inflatable child seat is provided with at least one port that is in communication with one or more of the air chambers, and serves as the means for inflating and deflating these chambers. The base panel has straps connected to it capable of engaging a latch lower anchor corresponding to a car or airplane seat.

In a still further embodiment in accordance with the principles of the present disclosure, a rear-facing inflatable child seat for use in an airplane is provided. The inflatable child seat includes a base panel having at least one inflatable air chamber. The inflatable child seat also includes two side panels, each of which have at least one inflatable air chamber. Both side panels are connected to the base panel. A back panel is further provided, having at least one inflatable air chamber, and is connected to the two side panels and the base panel. The back panel is disposed at an angle relative to the base panel from about 5° to about 80°. A headrest portion is also provided, and attached to the back panel. The headrest comprises at least one or more air chambers in communication with one another and the one or more air chambers of the back panel. The inflatable child seat also has a belt configured to restrain a child in the seat. The belt comprises a harness and is attached to both the back and base panels for securing the child in the inflatable seat. The inflatable child seat additionally has a cavity disposed in the back panel, and is configured for receiving a seat belt from an airplane or car seat for securing the child seat to the airplane or car seat. The inflatable child seat is provided with at least one port that is in communication with one or more of the air chambers and serves as the means for inflating and deflating these chambers. The inflatable child seat comprises a contiguous air chamber wherein the air chambers of the base, back, and sidewalls are all interconnected for simultaneous inflation and deflation of the entire inflatable seat. The inflatable seat also comprises a tray disposed between the sidewalls and attached to each of the sidewalls.

In a preferred embodiment of the invention, a rear-facing inflatable child seat for use in an airplane is provided. The inflatable child seat includes a base panel having at least one inflatable air chamber. The inflatable child seat also includes two side panels, each of which have at least one inflatable air chamber. Both side panels are connected to the base panel. A back panel is further provided, having at least one inflatable air chamber, and is connected to the two side panels and the base panel. The back panel is disposed at an angle relative to the base panel from about 5° to about 80°. A headrest portion is also provided, and attached to the back panel. The headrest comprises at least one or more air chambers in communication with one another and the one or more air chambers of the back panel. A mobile is further attached to the top of the back panel and serves as a distraction to a child in the inflatable seat. At least one or more speakers is disposed within the back panel, and the one or more speakers terminates in an audio jack that is capable of connecting to a music player, a cell phone, or an airplane seat audio input jack. A hood is further attached to the back panel, and is capable of shielding a child from ambient light so as to allow a child to sleep in flight. A handle for carrying the inflatable child seat when in use is also provided and is attached to the back panel by pivots. The handle is ratable so that it can be folded away when not needed and positioned to allow easy transport of the inflatable child seat when in use. The inflatable child seat also has a belt configured to restrain a child in the seat. The belt comprises a harness and is attached to both the back and base panels for securing the child in the inflatable seat. The inflatable child seat additionally has a cavity disposed in the back panel and is configured for receiving a seat belt from an airplane or car seat for securing the child seat to the airplane or car seat. The inflatable child seat is provided with at least one port that is in communication with one or more of the air chambers and serves as the means for inflating and deflating these chambers. The port further comprises an air valve capable of a user providing mouth inflation and deflation of the inflatable seat. The inflatable seat comprises a contiguous air chamber wherein the air chambers of the base, back, and sidewalls are all interconnected for simultaneous inflation and deflation of the entire inflatable seat. The inflatable seat also comprises a tray disposed between the sidewalls and attached to each of the sidewalls by plastic tabs. The tray further comprises at least one hale capable of inserting a cup or other similarly sized object within it. The sidewalls further comprise at least one pocket for the insertion of books or other materials for storage during a flight. Both the base and back panels contain a rigid element. When the inflatable seat is deflated and collapsed, the air chambers comprising the inflatable seat are capable of containment within the rigid elements of the back and base panels, which can then be secured together for transporting the inflatable seat easily. The tray is configured to be capable of conforming to the confines of the secured collapsed and deflated seat within the rigid element of the back and base panels.

The above embodiments are further described with reference to the figures and detailed description below.

BRIEF DESCRIPTION OF THE DRAWINGS

The above-mentioned and other features and objects of this disclosure, and the manner of attaining them, will become more apparent and the disclosure itself will be better understood by reference to the following description of embodiments of the disclosure taken in conjunction with the accompanying drawings, wherein.

DETAILED DESCRIPTION OF THE INVENTION

Accordingly, the inflatable child airplane seat in accordance with the principles of the present invention is constructed so as to secure a baby into an airplane seat using the seat belts provided on the plane seat or using an attachment to the seatbelts provided that is configured to attach to the inflatable seat to the airplane seat. The inflatable seat can be configured so as to seat the baby facing forward and/or rearwardly into the seat so as to be facing a parent sitting in an adjacent seat. Once the plane lands, the inflatable seat can either be deflated or easily stored in a suitcase or a bag provided for storage. The seat can also be configured to accept the standard seatbelts of a vehicle so that after landing, the same seat can be used as a car safety seat when transporting the child by vehicle.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The following discussion includes a description of the inflation device, related components, and exemplary methods of operating the inflation device in accordance with the principles of the present disclosure. Alternate embodiments are also disclosed. Reference will now be made in detail to the exemplary embodiments of the present disclosure, which are illustrated in the accompanying figures.

Figure 1:
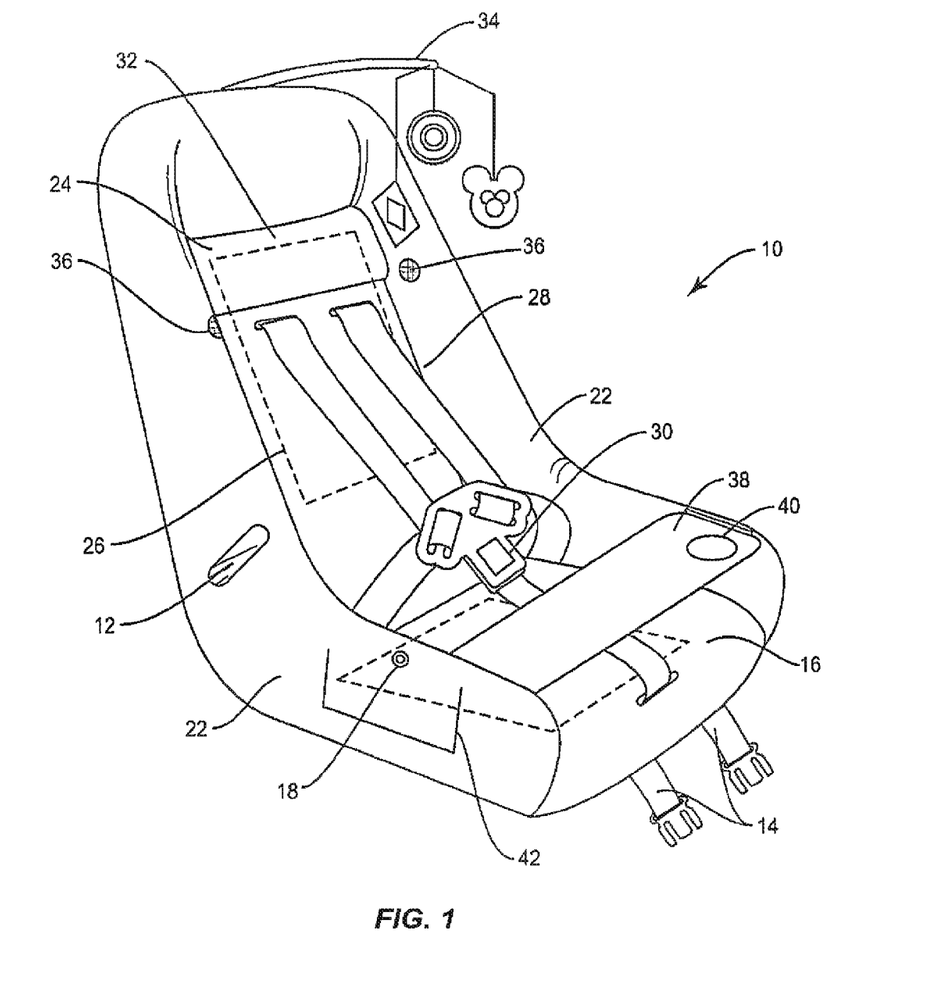
FIG. 1 is a front view of an inflatable child airplane seat according to the invention.
Figure 2:
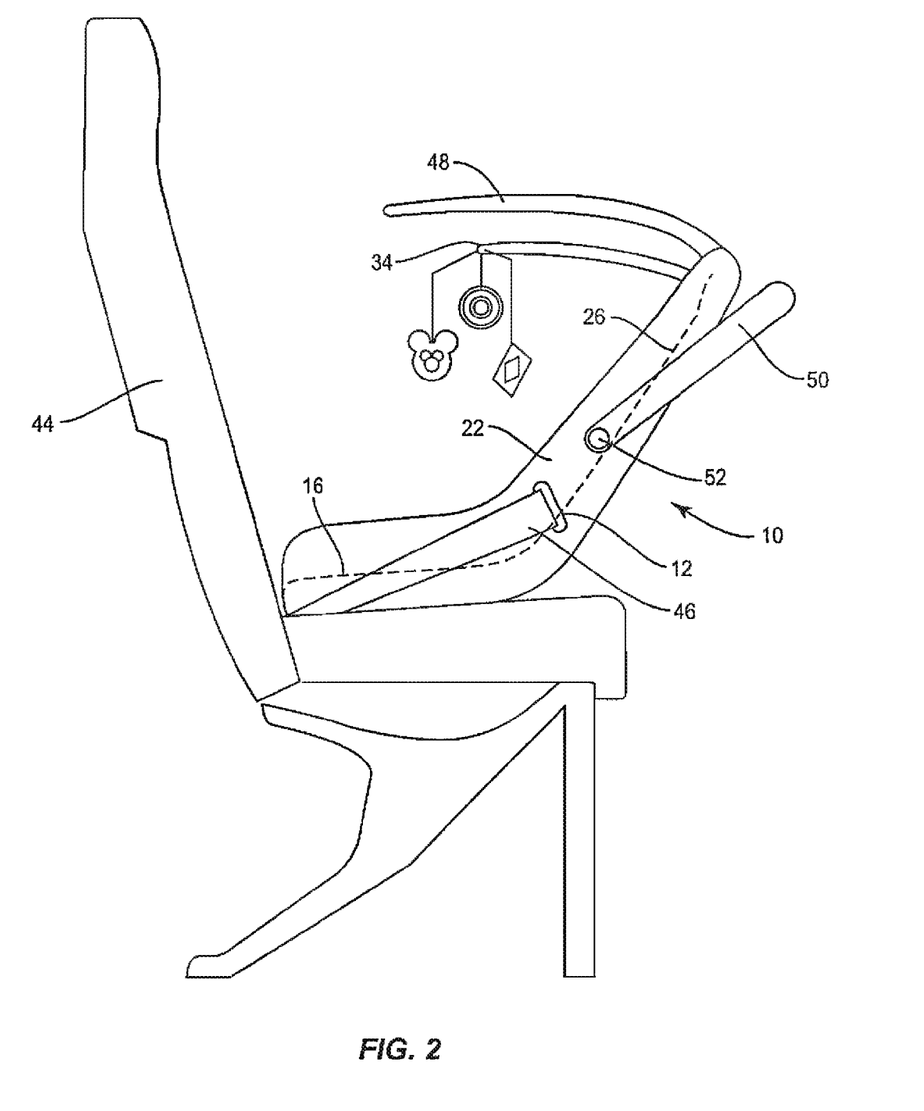
FIG. 2 is a side view of an inflatable child airplane seat according to the invention.
Figure 3:
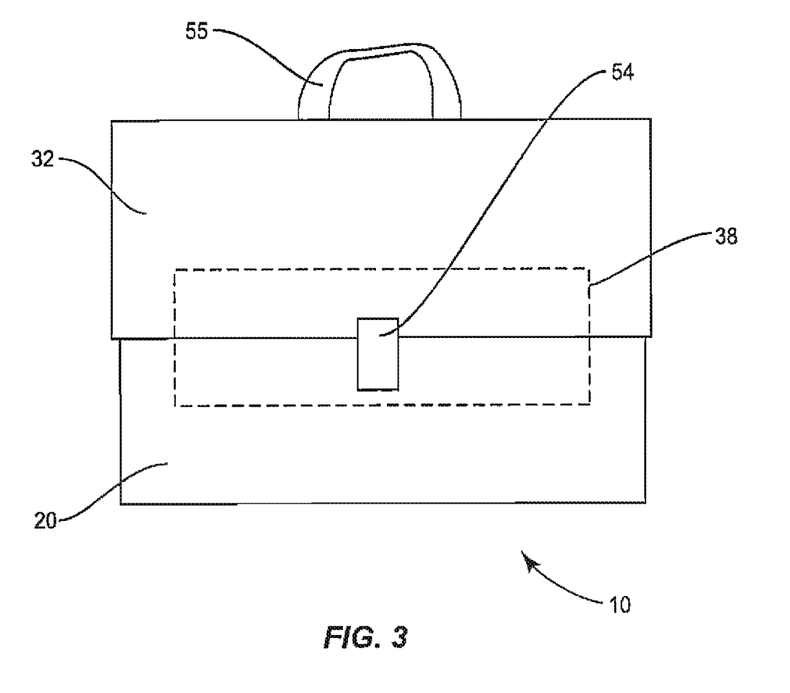
FIG. 3 is a front view of an inflatable child airplane seat according to the invention in its deflated and collapsed form.

Referring now to the drawing, and in particular FIGS. 1-3 thereof, therein illustrated is an inflatable child airplane seat according to the present invention, generally designated by reference number 10. As best seen in FIG. 1, the inflatable seat 10 is intended for use in an airplane or other vehicle seat (not shown) for securing the inflatable seat 10 by either a vehicle seatbelt through cavity 12 or latches 14.

More specifically, the inflatable seat 10 comprises a base panel 16, which has one or more air chambers for inflation or deflation. Port 18 is in communication with the air chamber of base 16, and can be further connected to an electric pump for automatic inflation of inflatable seat 10, or comprise an air valve for manual inflation by mouth or an air pump. Base 16 can further comprise a rigid element 20 for support and structure for the inflatable seat 10, and to allow the seat to be collapsed into a portable carrying device when deflated, as described herein in FIG. 3. Sidewalls 22 also each have at least one or more air chambers for inflation and deflation, and are connected to the base panel. Back panel 24 is connected to each of side panels 22 and base 16, and has one or more air chambers for inflation and deflation. Back panel 24 may also have a rigid element 26 for support and structure for the inflatable seat 10, and to allow the seat to be collapsed into a portable carrying device when deflated, as described herein in FIG. 3. Base 16 has a buckle 30 for receiving a securing device 28 located on back 24. The securing device 28 can comprise a 5-point harness system for securing the child in the inflatable seat 10.

Back 24 can also comprise a headrest portion 32 that contains one or more air chambers for the additional comfort of a child. Back 24 can also comprise a mobile 34 and one or more speakers 36 for the entertainment of the child during a flight. It is understood that speakers 36 are connected to one another and terminate in an audio jack suitable for connection to an audio device such as a portable music player, or other such devices, or for connection to an airplane seat's audio input jack.

For additional convenience to the parent or guardian, and for the comfort of the child using the inflatable seat 10, a tray 38 can be connected to sidewalls 22 for feeding the child or for placement of distracting toys. Tray 38 is configured to attach to sidewalls 22 through conventional structures such as plastic tabs, straps or metal snaps located on sidewalls 22 and tray 38. Tray 38 is comprised of a rigid material, and is capable of placement in the deflated collapsed structure of inflatable seat 10 when the seat is not in use. Tray 38 can further comprise holes 40 for placement of cups, bowls, or other materials to feed or distract a child. Sidewalls 22 can also comprise one or more pockets 42 on each side for the placement of books or small toys for storage when not being used by the parent or guardian.

Base 16, sidewalls 22 and back 24 can comprise a single contiguous air chamber, for inflation from a single port 18. Headrest 32 can also be adapted to comprise an air chamber in communication with base 16, sidewalls 22 and back 24. In the alternative, each of base 16, sidewalls 22 and back 24 and headrest 32 can contain an individual port 18 for more rapid inflation of the inflatable seat 10. Another contemplated embodiment of the inflatable seat 10 allows each of base 16, side walls 22 and back 24 and head rest 32 to possess multiple air chambers each with a separate port 18, to minimize the risk of complete deflation in the event that one portion of the inflatable seat 10 is punctured when in use, so that the entire device is not rendered unusable.

FIG. 2 shows the side view of the inflatable seat 10 as used in an airplane seat secured with the airplane seat's provided seatbelt. Inflatable seat 10 is shown using the seat in a rear-facing configuration relative to the airplane seat 44, and is attached to the inflatable seat 10 by airplane seatbelt 46 disposed of through cavity 12. Base 16 contains rigid element 20, and back 24 is at an angle relative to base 16. Back 24 contains rigid element 32 for support of the inflatable seat 10. Sidewalls 22 are also shown attached to base 16 and back 24. Back 24 is positioned at an angle relative to base 16 to recline a child using inflatable seat 10. The angle can be from about 5° to about 80°, preferably from about 15° to about 45°. FIG. 2 also shows mobile 34 and optional hood 48. Hood 48 can be comprised of the same inflatable material as the other portions of the inflatable seat 10, or can be made from other materials such as cotton or other flexible material. Hood 48 can contain ridges to allow for its folding and unfolding into the top of back 24. Handle 50 can be used in an alternate embodiment, allowing for the transport of a child when the seat is in use. Handle 50 is attached to base 24 at pivot points 52 and is rotable for placement of the handle in multiple orientations to allow for inflatable seat 10 to be picked up while in use. Handle 50 can be comprised of a rigid material such as conventional plastics, to allow for the structure and support necessary to suspend the inflatable seat 10. Although FIG. 2 displays inflatable seat 10 in a rear-facing configuration, it is understood that inflatable seat 10 can be used in a forward-facing position when the child reaches an age and weight appropriate for such a forward-facing position.

FIG. 3 depicts the inflatable seat 10 in a deflated and collapsed state. The rigid element 20 of base 16 folds with the rigid element 32 of back 24 so as to provide structure to the constructed traveling case. The traveling case is configured to be closed by strap 54. Securing strap 54 can be comprised of conventional materials such as hook and loop fasteners, snaps, or a latching mechanism to join the seat closed. Represented by the dotted internal line is tray 38 positioned within the deflated and collapsed inflatable seat 10 for its storage. Handle 55 is disposed on the top surface of rigid element 32 to allow for additional portability of the collapsed seat.

In an alternative embodiment according to the principles of the present disclosure, the base and back containing rigid elements 32 and 24 as shown in FIG. 3 can be configured without these rigid elements 32 and 34 so that the entire structure is inflatable. The inflatable base and back portions being configured either with multiple chambers and/or made from material that is able to withstand the force exerted thereupon, without deflating, in case an accident occurs. It is also envisioned that the base and back can be constructed with internal blowout ports that are designed to fail and absorb the force exerted thereupon without the entire base or back fully deflating.

While the invention has been illustrated and described in detail in the drawings and foregoing description, the same is to be considered as illustrative and not restrictive in character, it being understood that embodiments have been shown and described and that all changes and modifications that come within the spirit of this invention are desired to be protected.

What is claimed is:

1. An inflatable child seat, comprising:
   a base panel comprising a first rigid element and an inflatable air chamber;
   a pair of sidewalls each comprising an inflatable air chamber, each of the sidewalls being connected to the base panel, wherein a distance between the sidewalls defines a width of the inflatable child seat;

a back panel comprising a second rigid element and an inflatable air chamber, the back panel being connected to the base panel and each of the sidewalls, the back panel comprising an inner surface defining a cavity that extends the width of the inflatable child seat, the cavity being configured for disposal of a seat belt; and at least one port in communication with at least one of the air chambers for inflating at least one of the air chambers, wherein the sidewalls each include a hole and the inflatable child seat comprises a tray, wherein opposite ends of the tray each include a tab, the tabs being disposed in the holes to fix the tray relative to the sidewalls.

2. An inflatable child seat as recited in claim 1, wherein the air chambers comprise one contiguous air chamber.

3. An inflatable child seat as recited in claim 1, wherein the cavity extends through opposite lateral surfaces of the back panel.

4. An inflatable child seat as recited in claim 1, further comprising a harness fixed to the back panel and the base panel.

5. An inflatable child seat as recited in claim 4, wherein the harness comprises two spaced apart straps extending from the back panel and three spaced apart straps extending from the base panel.

6. An inflatable child seat as recited in claim 4, wherein:
the harness comprises two spaced apart straps extending from the back panel and three spaced apart straps extending from the base panel; and
one of the three spaced apart straps comprises a pair of spaced apart latches each configured to snap into a receptacle to fix the inflatable child seat relative to a fixed seat.

7. An inflatable child seat as recited in claim 1, wherein the back panel is disposed at an angle from about 5° to about 80° relative to the base panel.

8. An inflatable child seat as recited in claim 1, wherein the back panel is disposed at an angle from about 15° to about 45° relative to the base panel.

9. An inflatable child seat as recited in claim 1, wherein outer surfaces of the sidewalls that define the air chambers in the sidewalls are configured to engage a fixed seat when the air chambers in the sidewalls are inflated to fix the inflatable child seat relative to the fixed seat.

10. An inflatable child seat as recited in claim 1, wherein the first rigid element is configured to be secured to the second rigid element to form an outer surface of a carrying device, the air chambers being contained within an aperture of the carrying device defined by the rigid elements.

11. An inflatable child seat as recited in claim 10, wherein the carrying device comprises an upper surface defined by the second rigid element and a lower surface that is parallel to the upper surface, the lower surface being defined by the first rigid element, the carrying device comprising a handle extending from the upper surface.

12. An inflatable child seat as recited in claim 1, wherein:
the back panel comprises a first panel, a top panel connected to the first panel and a pair of spaced apart lateral panels each connected to the first panel and the top panel;
the top panel and the lateral panels each extend from the first surface in a common direction; and
the cavity extends through the back panel and the lateral panels.

13. An inflatable child seat as recited in claim 1, wherein the port comprises an electric pump.

14. An inflatable child seat as recited in claim 1, wherein the back panel, the base panel and the side panels each comprise an elastic material that is reinforced with a nylon backing.

15. An inflatable child seat as recited in claim 1, further comprising a handle connected to the back panel by pivot points such that the handle is rotatable about an axis of the back panel.

16. An inflatable child seat as recited in claim 1, wherein at least one of the back panel and the base panel comprise an internal blowout port that is designed to fail and absorb force exerted upon the back panel or the base panel without the back panel or the base panel fully deflating.

17. An inflatable child seat, comprising:
a base panel comprising a first rigid element and an inflatable air chamber;
a pair of sidewalls each comprising an inflatable air chamber and a hole, each of the sidewalls being connected to the base panel, wherein a distance between the sidewalls defines a width of the inflatable child seat;
a back panel comprising a second rigid element and an inflatable air chamber, the back panel being connected to the base panel and each of the sidewalls, the back panel comprising an inner surface defining a cavity that extends the width of the inflatable child seat, the cavity being configured for disposal of a seat belt;
at least one port in communication with at least one of the air chambers for inflating at least one of the air chambers; and
a tray extending between and connecting the sidewalls, wherein opposite ends of the tray each include a tab, the tabs being disposed in the holes to fix the tray relative to the sidewalls such that the tray is parallel with the base panel,
wherein the back panel, the base panel and the side panels each comprise an elastic material that is reinforced with a nylon backing and the air chambers comprise one contiguous air chamber.

18. An inflatable child seat as recited in claim 1, further comprising a headrest portion connected to the back panel, wherein the back panel is at an angle relative to the base panel.

19. An inflatable child seat, comprising:
a base panel comprising a first rigid element and an inflatable air chamber;
a pair of sidewalls each comprising an inflatable air chamber, each of the sidewalls being connected to the base panel, wherein a distance between the sidewalls defines a width of the inflatable child seat;
a back panel comprising a second rigid element and an inflatable air chamber, the back panel being connected to the base panel and each of the sidewalls, the back panel comprising an inner surface defining a cavity that extends the width of the inflatable child seat, the cavity being configured for disposal of a seat belt; and
at least one port in communication with at least one of the air chambers for inflating at least one of the air chambers,
wherein at least one of the back panel and the base panel comprise an internal blowout port that is designed to fail and absorb force exerted upon the back panel or the base panel without the back panel or the base panel fully deflating.

* * * * *

UNITED STATES PATENT AND TRADEMARK OFFICE
CERTIFICATE OF CORRECTION

| | | |
|---|---|---|
| PATENT NO. | : 8,905,477 B2 | Page 1 of 1 |
| APPLICATION NO. | : 14/019679 | |
| DATED | : December 9, 2014 | |
| INVENTOR(S) | : Andrew E. Curto | |

It is certified that error appears in the above-identified patent and that said Letters Patent is hereby corrected as shown below:

In the Specification

In column 5, line 44, after "handle is", delete "ratable" and insert --rotatable--.

Signed and Sealed this
Thirtieth Day of June, 2015

Michelle K. Lee
*Director of the United States Patent and Trademark Office*

UNITED STATES PATENT AND TRADEMARK OFFICE
CERTIFICATE OF CORRECTION

PATENT NO. : 8,905,477 B2  
APPLICATION NO. : 14/019679  
DATED : December 9, 2014  
INVENTOR(S) : Andrew E. Curto Page 1 of 1

It is certified that error appears in the above-identified patent and that said Letters Patent is hereby corrected as shown below:

In the Specification

In column 5, line 64, after "least one", delete "hale" and insert -- hole --.

Signed and Sealed this  
Twenty-ninth Day of September, 2015

Michelle K. Lee  
*Director of the United States Patent and Trademark Office*